C. ADAMS.
MEAT CUTTER.
No. 32,852.  Patented July 23, 1861.
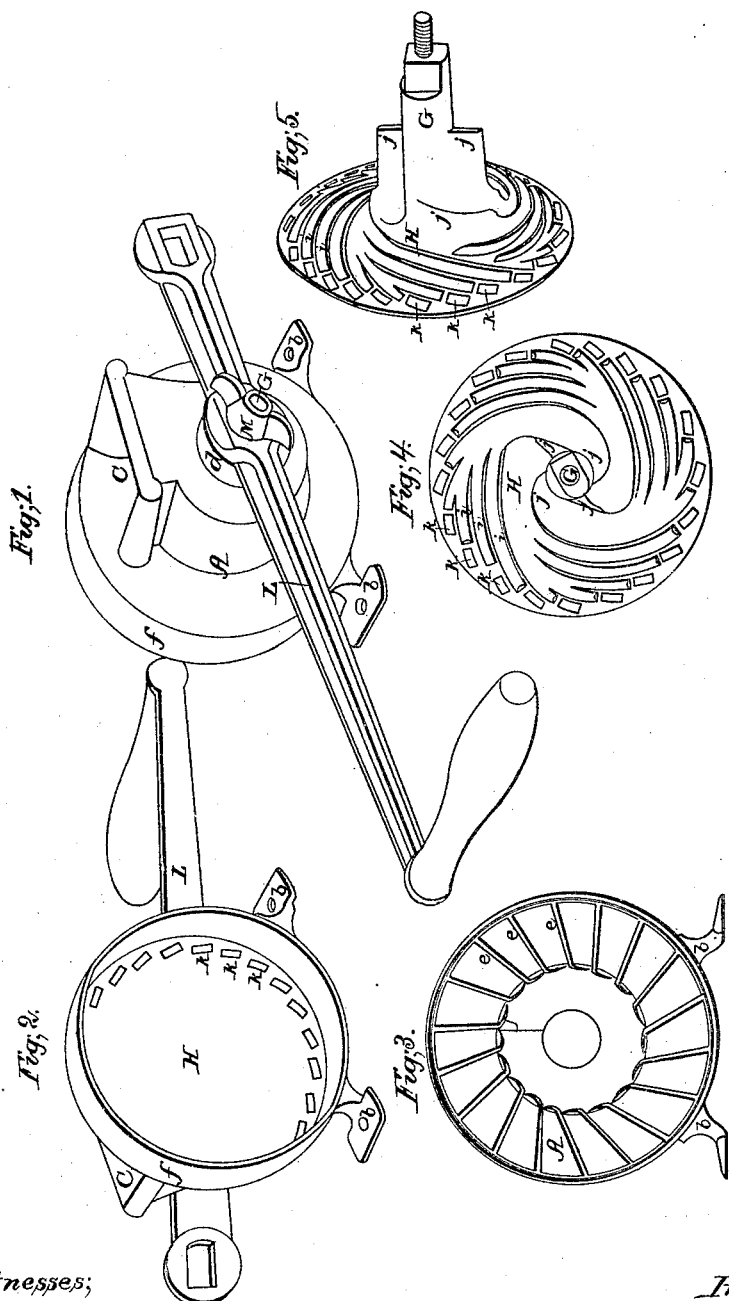

UNITED STATES PATENT OFFICE.

CALVIN ADAMS, OF PITTSBURG, PENNSYLVANIA.

IMPROVED MEAT-CUTTER.

Specification forming part of Letters Patent No. 32,852, dated July 23, 1861.

*To all whom it may concern:*

Be it known that I, CALVIN ADAMS, of the city of Pittsburg, in the State of Pennsylvania, have invented certain new and useful Improvements in the Manufacture of Meat-Cutters; and I do hereby declare that the following is a full, clear, and exact description of the construction and operation of the same, reference being had to the accompanying drawings, making a part of this specification, in which—

Figure 1 represents a perspective view of said meat-cutter. Fig. 2 represents a perspective view of the same, as seen from the reverse side of Fig. 1. Fig. 3 represents a face view of the casing or body of the machine with its cutters. Fig. 4 represents a face view of the revolving disk with its shaft and cutters, the cams that force the meat between the cutters and the openings through which the meat is discharged when cut. Fig. 5 is a perspective view of the revolving disk.

To enable others skilled in the art to make and use my invention, I will proceed to describe its construction and operation.

A represents the casing or body of the machine.

$b\ b$ are the feet on which it rests, having apertures for fastening it to the table, bench, or shelf with screws, when used.

C is the opening or hopper through which the meat is introduced.

$d$ is a collar, through which the shaft G of the revolving disk H is passed.

$e\ e.e$ are the stationary cutters; $f$, a rim or band, into which the revolving disk H is closely fitted, only allowing room for it to revolve.

H is the revolving disk on which is formed the cutters $i\ i\ i\ i$ and the cams $j\ j\ j\ j$, and through which are the openings $k\ k\ k$.

L is the crank fastened to the end of the shaft G by means of the screw-nut M.

The operation of this machine is as follows: The meats (which may be in strips) is passed into the opening or hopper C. The cams $j\ j\ j\ j$ then force it between the stationary and revolving cutters $e\ e$ and $i\ i$ by turning the crank L. The cutters, working together like shears, not only cut the meat, but as they cut it carry it along the spaces between the stationary cutters to and through the openings $k\ k;$ and it will be seen that as the openings $k\ k$ have cutting-edges and pass the stationary cutters $e\ e$ the meat must be uniformly cut and free from strings or long pieces.

The cutters may be made of steel and inserted in the cast metal.

The advantages of this meat-cutter are, its superior and uniform manner of cutting the meat, its cheapness, durability, and the action of the cutters upon each other, making them, as will be seen, self-sharpeners, and that the machine is not liable to get out of repair.

Having thus fully described the nature of my invention, what I claim as new, and desire to secure by Letters Patent, is—

The combination, with the revolving disk H, of the cams $j\ j$, and cutters $i\ i$, and openings $k\ k$, arranged with stationary cutters $e\ e$ on door or casing A, all substantially as and for the purpose specified.

CALVIN ADAMS.

Witnesses:
W. B. COPELAND,
S. JARVIS ADAMS.